May 30, 1961 R. S. JOSE ET AL 2,986,631

FREQUENCY CONTROL SYSTEM FOR FM TRANSMITTER

Filed May 29, 1958 4 Sheets-Sheet 1

INVENTORS
ROBERT S. JOSE &
FRANKLIN E. TALMAGE
BY F. A. Rechif
ATTORNEY

May 30, 1961 R. S. JOSE ET AL 2,986,631

FREQUENCY CONTROL SYSTEM FOR FM TRANSMITTER

Filed May 29, 1958 4 Sheets-Sheet 2

INVENTORS
ROBERT S. JOSE &
FRANKLIN E. TALMAGE
BY F. A. Rechif
ATTORNEY

INVENTORS
ROBERT S. JOSE &
FRANKLIN E. TALMAGE
BY
ATTORNEY

FREQUENCY CONTROL SYSTEM FOR FM TRANSMITTER

Filed May 29, 1958 4 Sheets-Sheet 4

INVENTORS
ROBERT S. JOSE &
FRANKLIN E. TALMAGE
BY F. A. Rechif
ATTORNEY

United States Patent Office 2,986,631
Patented May 30, 1961

2,986,631

FREQUENCY CONTROL SYSTEM FOR FM TRANSMITTER

Robert S. Jose, Moorestown, and Franklin E. Talmage, Westmont, N.J., assignors to Radio Corporation of America, a corporation of Delaware Filed May 29, 1958, Ser. No. 738,871

15 Claims. (Cl. 250—17)

This invention relates to a system for maintaining the center frequency of a frequency modulation (FM) transmitter constant, within specified limits. Specifically, the system of the invention is applicable to a standard television (TV) transmitter, for maintaining the center frequency of the aural FM transmitter within specified limits with respect to the carrier frequency of the visual transmitter. Present standards of the Federal Communications Commission (FCC) require the aural center frequency to be maintained at 4.5 mc.±1000 c.p.s. above the visual carrier frequency.

In the past, one way of meeting this standard was to provide means for stabilizing both carriers sufficiently so that the total change of both was not in excess of ±1000 c.p.s., about their respective carrier frequencies. Such a scheme, however, often is quite complicated, and at best is rather expensive. The more usual present practice in meeting the aforementioned FCC requirement employs an intercarrier control scheme, wherein the actual aural-visual carrier frequency spacing is compared to an independent reference frequency. An error signal developed in this comparison is fed back to control the center frequency of the aural oscillator. This scheme requires only one highly precise frequency, the visual carrier. However, it does require the use of frequency dividers or counters, as well as a careful control of the FM modulation index; such dividers are necessary in the prior art to reduce the modulation index so that the FM carrier never disappears, as it does at certain modulation indices.

The system of the present invention is broadly of the intercarrier classification, in that it makes use of the actual aural-visual carrier frequency spacing. However, it does not require any counters or frequency dividers, and the FM modulation index is unimportant.

With the system of the present invention, the total number of tubes is substantially reduced as compared to prior systems.

An object of this invention is to provide a novel frequency control circuit for an FM transmitter.

Another object is to provide a novel control circuit for maintaining the aural center frequency of a TV transmitter at a predetermined frequency relationship to the visual carrier frequency of such transmitter.

A further object is to provide an intercarrier type of frequency control system for a TV transmitter, which is considerably less complex than previous systems and yet does not sacrifice any stability.

The objects of this invention are accomplished, briefly, in the following manner: Two crystal oscillators whose frequencies lie equal amounts respectively above and below the predetermined aural-visual difference frequency (which latter may be 4.5 mc.) are alternately (at a low frequency rate) gated to a common circuit connection comprising one of the two inputs to a mixer, the other mixer input being supplied by the actual aural-visual difference frequency, obtained from an aural-visual mixer. In the mixer output, there appear two beat frequency waves (one during each of the separate gating periods) which are equal in frequency when the difference frequency is at the proper value but which are unequal in frequency when the difference frequency is not at the predetermined value. By means of a circuit including a frequency-to-amplitude converter and rectifier, any frequency inequality between the two beat frequency waves is detected and reduced to a D.C. control potential proportional to the amount of the inequality, and this control potential is utilized to adjust the center frequency of the aural transmitter to bring the aural-visual difference frequency to the correct, predetermined value.

A detailed description of the invention follows, taken in conjunction with the accompanying drawings, wherein.

Figure 1:
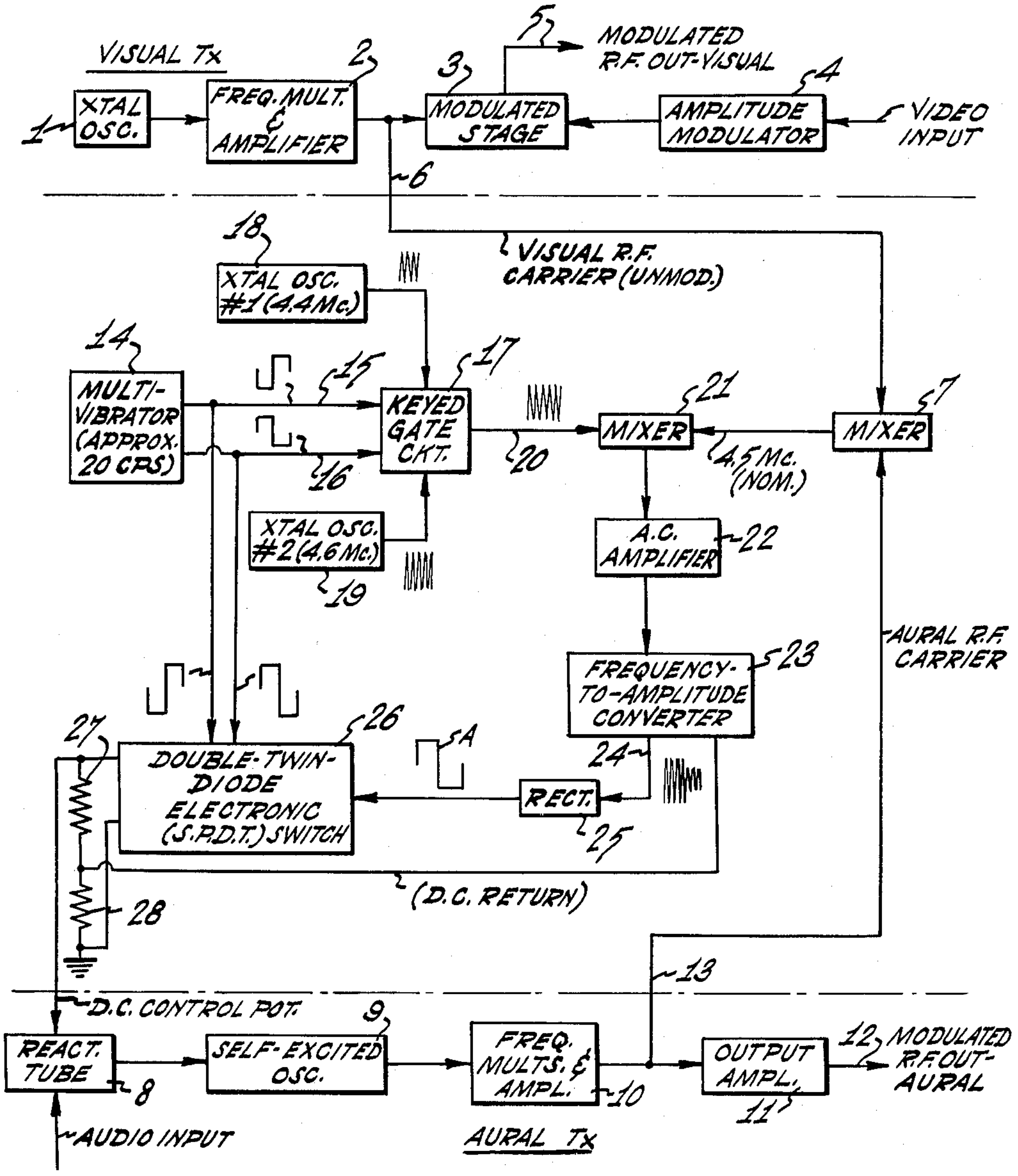
Fig. 1 is a block diagram of a presently-preferred frequency control system according to this invention.

First referring to Fig. 1, a portion of the visual transmitter half of a TV transmitter is illustrated above the upper dot-dash line. A crystal oscillator 1, preferably operating at a subharmonic or submultiple of the final visual carrier frequency, feeds its output through a frequency multiplier and amplifier unit 2 to the carrier input of a modulated stage 3. A composite video signal is fed to an amplitude modulator 4 which operates to amplitude modulate the radio frequency (RF) carrier signal, in modulated stage 3. The output of modulated stage 3, comprising an amplitude modulated carrier wave, is the final modulated visual output of the TV transmitter and is taken off via a lead 5 for utilization. No frequency changes occur in the visual transmitter subsequent to the output of unit 2, and no modulation occurs prior to such output, so that the output of unit 2 comprises the unmodulated visual carrier at the final RF frequency. This output is sampled for application to the frequency control portion of the overall system, by means of a lead 6 which feeds the sample to one input of a mixer 7.

A portion of the aural transmitter half of a TV transmitter is illustrated below the lower dot-dash line in Fig. 1. The audio input signal is fed to a reactance tube 8 for FM of a self-excited oscillator 9, which preferably operates at a center or rest frequency which is a subharmonic or submultiple of the final aural frequency. The frequency modulated output of oscillator 9 is fed through a frequency multiplier and amplifier unit 10 to an output amplifier 11. The output of amplifier 11, comprising a frequency modulated wave, is the final modulated aural output of the TV transmitter and is taken off via a lead 12 for utilization. The leads 5 and 12, for example, may be coupled to the inputs of a suitable combining network (such as a diplexer), the output of which may be coupled to a suitable utilization circuit, such as a transmission line or an antenna. No frequency changes occur in the aural transmitter subsequent to the output of unit 10, so that such output comprises the aural signal at the final RF frequency. This output is sampled for application to the frequency control portion of the overall system, by means of a lead 13 which feeds the sample to the other input of mixer 7.

Mixer 7 is the aural-visual mixer, wherein the aural and visual RF carriers beat together to produce, among other frequencies, a difference frequency which is intended to be, and is nominally, 4.5 mc. It is the actual difference frequency output of mixer 7 (the actual average aural-visual difference frequency) which is to be maintained at a predetermined value (4.5 mc., by way of example).

A multivibrator 14 of any convenient type generates a pair of keying signals (e.g., substantially rectangular or square waves) at a fundamental frequency which is below the lowest audio frequency the aural (FM) transmitter is called upon to handle. By way of example, the multivibrator frequency is approximately 20 c.p.s., while the lowest audio frequency is 50 c.p.s. The keying signals (square waves of opposite phases, as indicated adjacent the multivibrator output leads 15 and 16, respectively) are used to control a keyed gate circuit 17. A crystal oscillator 18, which may be termed crystal oscillator No. 1, operates at a frequency of 4.4 mc. and supplies one input signal to gate circuit 17. A crystal oscillator 19, which may be termed crystal oscillator No. 2, operates at a frequency of 4.6 mc. and supplies the other input signal to gate circuit 17. It is to be noted that the frequencies of oscillators 19 and 18 lie equal amounts respectively above and below the predetermined frequtncy of 4.5 mc.

The keyed gate circuit 17 operates; in response to the keying signals supplied thereto from multivibrator 14 over leads 15 and 16, to gate alternately to a common output circuit (represented by lead 20) the outputs of oscillators 18 and 19. This gating is performed at the multivibrator frequency of approximately 20 c.p.s. The signal out of gate circuit 17 (and appearing on lead 20) is therefore a continuous quasi-sine wave which alternates back and forth at a 20-c.p.s. rate between 4.4 and 4.6 mc., and whose amplitude is relatively constant. This signal is coupled to one input terminal of a mixer 21. This mixer's other input comes from the signal output of mixer 7, whose frequency, as stated previously, is nominally 4.5 mc. and which is derived from mixing the aural and visual carrier frequencies.

Two beat frequency waves are produced by the action of mixer 21, one during the time that oscillator 18 is gated on to mixer 21 and the other during the time that oscillator 19 is gated on to mixer 21. If the average aural-visual carrier frequency difference (the output of mixer 7) is exactly 4.5 mc., these two beat frequency waves will be equal in frequency, at 100 kc. Then, the output frequency of mixer 21 will be steady at 100 kc. This is a consequence of its two input signals having a frequency difference of exactly 100 kc. at all times, even though one input signal (that derived from gate circuit 17) is not constant in absolute frequency.

If the aural-visual carrier frequency difference is not exactly 4.5 mc., then the frequencies of the two beat frequency waves will be unequal, and the output of the mixer 21 will not be a steady 100 kc. signal, but will change, at the multivibrator switching rate, from one value of frequency to another. For example, if the aural-visual carrier frequency difference increases to 4.501 mc. (4,501,000 c.p.s.), the output of mixer 7 is at this frequency. Then, the output of mixer 21 is 99 kc. when the 4.6-mc. oscillator 19 is gated on to this same mixer, and is 101 kc. when the 4.4-mc. oscillator 18 is gated on to this mixer.

The output of mixer 21 is fed through an A.C.-coupled amplifier 22 to a frequency-to-amplitude converter circuit 23, which may be in the form of a simple series resonant circuit, resonant at about 102 kc. It is essential here that the resonant frequency of the resonant circuit 23 be above the highest beat frequency normally expected to appear in the output of mixer 21, so that there will be a non-ambiguous, proportional relationship between the frequency of the input to converter 23 and the amplitude of the output therefrom, at least between the lowest and highest beat frequency values normally expected out of mixer 21. Further, if the resonant frequency of the series circuit is above 100 kc. it may be seen that the response slope is such that it forms a sort of low-pass filter, and so switching transients and other extraneous high frequencies are removed from the output of the frequency-to-amplitude converter 23. The resonant frequency of the resonant circuit 23 should be such that the slope of the output voltage vs. input frequency characteristic of converter 23 does not change sign over the input frequency range of interest or concern.

For the particular case of a steady 100-kc. input signal to converter 23 (which, it will be remembered, is the result of the average aural-visual carrier frequency difference being exactly 4.5 mc.), the amplitude of the output of converter 23 will have a certain value and will be relatively constant, that is, its amplitude will not change during successive half-cycles of the keying signal output of multivibrator 14.

Now, if the aural carrier frequency changes, the following will happen. The ensuing description would be equally true if the visual carrier changed frequency, but the presumption is that the visual carrier will be accurately controlled (by means of the crystal of oscillator 1) and so is, therefore, chosen as a reference. Any changes will be considered to be due to a shift or drift in the center or unmodulated aural carrier frequency with respect to the visual carrier frequency. Under these conditions, the output of the mixer 21 is not a steady 100-kc. signal, but changes frequency back and forth at the switching rate of multivibrator 14. Assuming as an example that the aural carrier is 1000 c.p.s. above its nominal value, then the output of the mixer 7 is 4,501,000 c.p.s., as stated previously by way of example, and the output of mixer 21 is 99 kc. when oscillator 19 is gated on to mixer 21 and is 101 kc. when oscillator 18 is gated on to this mixer. This alternating (in frequency) signal is converted by converter 23 to a signal whose amplitude alternates between two values, proportional to the frequency inequality in the two beat frequency waves. This alternating-amplitude signal is illustrated adjacent the converter output connection 24. This type of signal out of converter 23 results from the input frequency vs. output amplitude characteristic of said converter, different input frequencies resulting in different output amplitudes.

The alternating-amplitude signal out of converter 23 alternates between its two amplitude values at the multivibrator keying or switching rate. This signal is rectified by a rectifier 25 to produce a substantially square wave A at the multivibrator keying rate, the peak-to-peak amplitude of this square wave being proportional to the amplitude variation in the signal out of converter 23, and therefore also to the amount of the frequency inequality between the two beat frequency waves produced in mixer 21. Also, the phase of the square wave A, relative to the phase of a particular one of the two switching wave outputs of multivibrator 14 (e.g., that output on lead 15), depends upon the direction of frequency drift of the aural carrier, and would be opposite to that illustrated if the aural carrier had drifted downward in frequency from its nominal value.

The substantially square wave A is applied as input to an electronic switch 26 which is controlled or operated by the original multivibrator switching signals appearing on leads 15 and 16. Switch 26 operates, in a manner to be more fully described hereinafter, as a single-pole, double-throw switch, to complete a circuit between the output of rectifier 25 and one of two loads (represented by resistors 27 and 28) during one-half-cycle of the multivibrator 20-c.p.s. switching wave, and to complete a circuit between this rectifier output and the other of the two loads during the next half-cycle of the 20-c.p.s. switching wave, and repeat.

The loads 27 and 28 are connected differentially or in series opposition, one end of load 28 being grounded and the final D.C. control potential being taken off from one end of load 27. In other words, the voltages across the two loads are subtractively combined. The action of the switch 26 and loads 27 and 28 is therefore such as to produce (at the upper end of load 27) a D.C. voltage (or D.C. control potential) proportional in amplitude to that of the substantially square wave A, and of a polarity depending upon the phase of the square wave A relative to one of the multivibrator switching waves.

If the aural carrier frequency drifts low, the phase of the square wave A (and also, of course, of the output of converter 23) shifts 180° from that illustrated. Under these conditions, the output of the arrangement 26—28 (i.e., the D.C. control potential) changes polarity, and is still proportional to the amount of the aural carrier frequency shift.

The D.C. control potential at the upper end of load 27 is fed to the reactance tube 8 in the aural transmitter as a frequency control potential, to control the center frequency of the aural oscillator 9. The center frequency control system described produces at the output of mixer 7 (and thus also at the outputs of the aural and visual transmitters) an intercarrier beat frequency exactly halfway between the two gated crystal frequencies (of oscillators 18 and 19). Since the visual carrier frequency is a reference, as has previously been pointed out, it follows that the aural carrier must also be on frequency.

When the aural carrier is on its proper frequency, there is a steady 100-kc. signal out of mixer 21, since in this case there is a 4.5-mc. signal out of mixer 7 and both beat frequencies produced in mixer 21 are equal. In this case, the output of converter 23 (on lead 24) is a signal of unvarying or constant amplitude, so that the output of rectifier 25 now has not a square waveform such as A, but instead has a substantially straight (horizontal) waveform. Then, there is a net voltage of zero across the load resistors 27, 28, giving a D.C. control potential (to be applied to reactance tube 8 of the aural transmitter) of zero volts. In this case, no frequency controlling action is effected, but none is needed, since the center frequency of the aural transmitter is now proper, at 4.5 mc. above the visual carrier frequency.

The arrangement of the present invention has several advantages as compared with the prior art. First, it is of no importance if the FM carrier itself disappears, as it does at certain modulation indices. The frequency control system of the invention will still operate by utilizing the sidebands, since an aural average or center frequency is in effect developed from these sidebands and utilized in mixer 7. As a consequence, the need for frequency dividers, to reduce the modulation index so that the carrier never disappears, is eliminated. Frequency dividers are quite often difficult to design and maintain in proper adjustment. So, the total number of tubes is reduced as compared to the prior art, and the adjustments are simplified.

Further, the only elements in the frequency control system on which a stability requirement is placed are the crystals (in oscillators 18 and 19). Crystals are, of course, inherently quite stable. Any error in their frequency will be reduced to one-half in its effect on the aural center frequency, so they need to be stable only within ±1000 c.p.s. (which is the total permissible error). This assumes (and this is only a moderate requirement) that the frequency-to-amplitude converter's characteristic is straight over the region of crystal frequency error. This amounts to a tolerance of a little more than 0.02 percent, which is a very loose tolerance for crystals.

Another advantage of the system described is that a "single-ended" frequency-to-amplitude converter 23, on which practically no restriction as to linearity is placed, can be employed. The control potential fed to the reactance tube 8 of the aural transmitter will be such as to make the voltages across the two loads 27 and 28 equal (i.e., their difference zero), and this can be accomplished with little regard as to how the frequency-to-amplitude characteristic behaves, shape-wise. Furthermore, since the converter 23 operates at a rather low frequency (on the order of 100 kc.), the number of c.p.s. drift in the resonant frequency of this circuit can easily be kept small.

Figure 2:
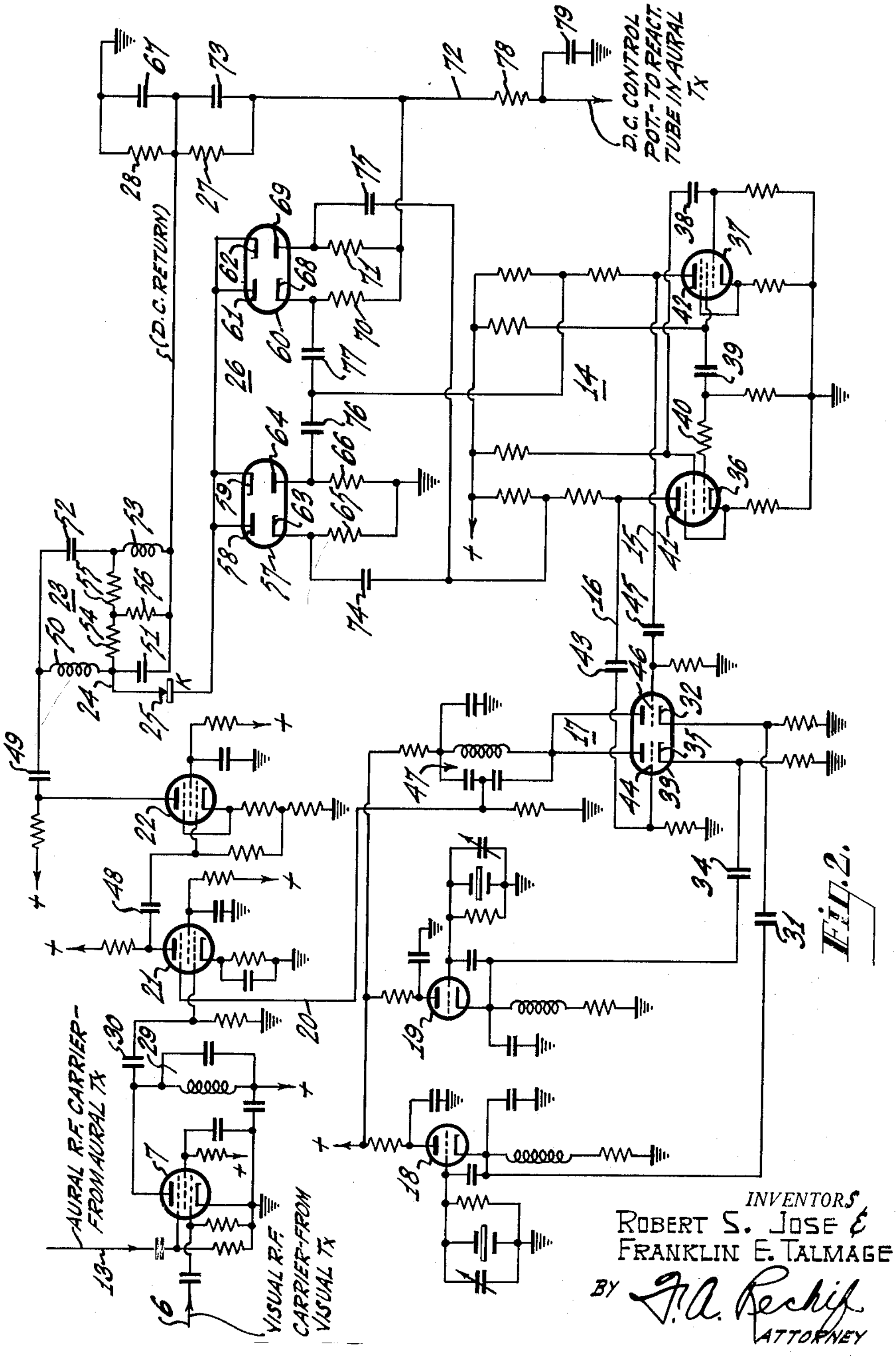
Fig. 2 is a detailed circuit diagram of the control portion of the Fig. 1 system.

Fig. 2 is a schematic (circuit) diagram of the frequency control portion of the system of Fig. 1. In Fig. 2, elements the same as those of Fig. 1 are denoted by the same reference numerals. The visual RF carrier from unit 2 of the visual transmitter is fed by means of connection 6 to grid No. 1 of a pentode vacuum tube 7 which is the aural-visual mixer. The aural RF carrier from unit 10 of the aural transmitter is fed by means of connection 13 to grid No. 3 of mixer tube 7. The intercarrier difference frequency (the actual aural-visual difference frequency, nominally 4.5 mc., which is the predetermined or desired value) is taken off from the anode of tube 7, separated from the sum frequency by means of a tuned circuit 29, and fed through a coupling capacitor 30 to grid No. 1 of a pentode vacuum tube 21 operating as a mixer.

Crystal oscillator No. 1 includes a triode electrode structure 18 connected into a crystal oscillator circuit operating at a frequency of 4.4 mc. The output of this oscillator is taken off from the cathode of structure 18 and fed by way of a coupling capacitor 31 to one input of the keyed gate circuit 17, this connection being completed from capacitor 31 to one cathode 32 of a twin triode vacuum tube 33 connected to operate as the gate circuit 17. Crystal oscillator No. 2 includes a triode electrode structure 19 connected into a crystal oscillator circuit operating at a frequency of 4.6 mc. The output of this oscillator is taken off from the cathode of structure 19 and fed by way of a coupling capacitor 34 to the other input of gate circuit 17, this connection being completed from capacitor 34 to the other cathode 35 of the twin triode 33.

The multivibrator 14 comprises a pair of pentode electrode structures 36 and 37, which are intercoupled for the generation of oscillations at a low frequency, such as 20 c.p.s. Although structures 18, 19, 36, and 37 are shown in separate envelopes, these structures may advantageously be combined in such a way that structures 18 and 36 together constitute a type 6U8 vacuum tube, and structures 19 and 37 together constitute a type 6U8 vacuum tube. Grid No. 2 of structure 36 is coupled to grid No. 1 of structure 37 by means of a capacitor 38, while grid No. 2 of structure 37 is coupled to grid No. 1 of structure 36 by means of a capacitor 39 and a small resistor 40. The output of the multivibrator 14, comprising substantially square keying waves of opposite relative phases, is taken off from the respective anodes, anode 41 of structure 36 (to which lead 16 is coupled) and anode 42 of structure 37 (to which lead 15 is coupled). By using grid No. 2 of each of structures 36 and 37 as the multivbrator anode, and by taking the multivibrator keying wave outputs from the anode electrodes of these structures, more nearly square waves may be derived for utilization as the keying signals.

Lead 16 couples one of the two multivibrator keying waves (substantially square waves) from anode 41 through a coupling capacitor 43 to one grid 44 of the twin-triode tube 33, grid 44 being associated with cathode 35 of this tube. Lead 15 couples the other of the two multivibrator keying waves (substantially square waves) from anode 42 through a coupling capacitor 45 to the other grid 46 of tube 33, grid 46 being associated with cathode 32 of this tube. The two anodes of tube 33 are connected together and to a common output circuit 47 which latter includes an inductor across which are connected two capacitors in series. From the common junction point of these capacitors, lead 20 extends to grid No. 3 of mixer tube 21, so that the single output of keyed gate circuit 17 is fed to mixer 21.

As previously stated, the keying signals appearing at the multivibrator anodes 41 and 42 (and applied to the grids 44 and 46) are of opposite relative phases, and these keying signals are in the form of substantially square waves. When the signal on lead 16 goes positive, allowing the grid 44 to go positive, the left-hand triode of tube 33 conducts, causing a clamping action to take place on grid 44. When this triode conducts, the signal emanating from oscillator 19 (and applied to the left-hand cathode 35) is keyed or gated to the common output circuit 47, and also on to mixer 21. When the grid 44 is thus driven positive, the voltage applied to grid 46 is sufficiently negative so that the right-hand triode of tube 33 does not conduct.

During the next half-cycle of the keying wave, the signal on lead 16 goes negative (cutting off the left-hand triode of tube 33), and the signal on lead 15 goes positive. When the signal on lead 15 goes positive, allowing the grid 46 to go positive, the right-hand triode of tube 33 conducts, causing a clamping action to take place on grid 46. When this triode conducts, ths signal emanating from oscillator 18 (and applied to the right-hand cathode 32) is keyed or gated to the common output circuit 47, and also on to mixer 21.

It may be seen, from the above, that the keyed gate circuit 17 operates to supply alternately, to grid No. 3 of mixer 21, the outputs of oscillators 19 and 18. The output of each of these two oscillators is supplied to mixer 21 during a respective half-cycle of the keying wave output of multivibrator 14.

The output of mixer 21 is taken off from the anode of this tube and fed through a coupling capacitor 48 to the input or control grid of a pentode vacuum tube 22 operating as an A.C. amplifier. As previously described, the output of mixer 21 may be either a steady 100-kc. signal (when the aural transmitter frequency is correct, which results in a 4.5-mc. signal out of mixer 7), or it may be a signal which alternates in frequency back and forth at the multivibrator switching rate (when the aural transmitter frequency is incorrect, which results in a signal different from 4.5 mc. out of mixer 7).

The A.C. amplifier 22 amplifies the signal out of mixer 21, whatever may be its nature. The output of amplifier 22 is taken offi from the anode of this tube and fed through a coupling capacitor 49 to the input of the frequency-to-amplitude converter 23. The active portion of this converter comprises an inductor 50 connected in series with a capacitor 51 in that order from capacitor 49, together forming a series resonant circuit having a resonant frequency somewhat above 100 kc. For purposes of symmetry, a similar circuit comprising a capacitor 52 connected in series with an inductor 53 in that order from capacitor 49, is connected in parallel with the LC combination 50—51. The output lead 24 of converter 23 is connected to the junction of inductor 50 and capacitor 51, and this junction is isolated from the junction of capacitor 52 and inductor 53 by means of a T-pad comprising series resistors 54 and 55 and shunt resistor 56.

The output lead 24 of converter 23 feeds the converter output to the anode of diode rectifier 25, and the cathode of this diode is connected to the input side of the double-twin-diode electronic single-pole double-throw switch 26. One twin diode 57 of switch 26 has its left-hand anode 58 and its right-hand cathode 59 connected to the cathode of diode 25. The other twin diode 60 of switch 26 has its left-hand anode 61 and its right-hand cathode 62 connected to the cathode of diode 25. The left-hand cathode 63 and the right-hand anode 64 of diode 57 are connected through respective resistors 65 and 66 to ground, and thereby also to the upper end of load resistor 28. A capacitor 67 is connected across resistor 28. The left-hand cathode 68 and the right-hand anode 69 of diode 60 are connected through respective resistors 70 and 71 to the D.C. control potential (or AFC) lead 72, and also to the lower end of load resistor 27. A capacitor 73 is connected across resistor 27.

In order to operate the electronic switch 26, a portion of the same keying signal or keying wave appearing on multivibrator output lead 16 is applied through a capacitor 74 to cathode 63, and through a capacitor 75 to anode 69. Also, a portion of the same keying signal or keying wave appearing on multivibrator output lead 15 is applied through a capacitor 76 to anode 64, and through a capacitor 77 to cathode 68.

To explain the operation of the switch 26, it will be assumed that the aural transmitter is off frequency in such a direction as to produce at lead 24, beginning with a certain instant of time corresponding to one of the transitions of the multivibrator keying waves, a high amplitude portion (corresponding in length to a half-cycle of the keying wave) followed by a lower amplitude portion (again corresponding in length to a half-cycle of the keying wave). Then, at the cathode of diode 25, there will be a keying wave cycle comprising first a positive half-cycle, and then a negative half-cycle, each with respect to the average value of voltage appearing at the diode 25's cathode. The keying waves are assumed (beginning with the same instant of time) to be as in Fig. 1, namely, on lead 16 (at anode 41) a positive half-cycle followed by a negative half-cycle, and on lead 15 (at anode 42) a negative half-cycle followed by a positive half-cycle.

During the first half-cycle of the keying wave, the positive voltage (part of that on lead 16) is applied to cathode 63 and to anode 69. The positive cathode voltage biases off the diode 58, 63, but the positive anode voltage biases on the diode 62, 69. During this same first half-cycle of the keying wave, the negative voltage (part of that on lead 15) is applied to anode 64 and to cathode 68. The negative anode voltage biases off diode 59, 64, but the negative cathode voltage biases on diode 61, 68. Thus, it may be seen that during this first half-cycle, both diodes of twin-diode 60 are biased to conduct, but both diodes of twin-diode 57 are biased off.

During this first half-cycle, then, the positive voltage at the cathode of diode 25 is effective to cause a flow of current through diode 61, 68, resistor 70, and resistor 27 and the D.C. return back to the other side of diode 25 through resistors 56 and 54. This causes the lower end of resistor 27 to be positive with respect to its upper end. (If the voltage at the cathode of diode 25 had been negative during this first half-cycle, the flow of current would have been in the other direction, through diode 62, 69, and the upper end of resistor 27 would become positive with respect to its lower end.)

It may be seen, from the above, that the "throw" of switch 26 is to load 27 during the first half-cycle of the keying wave.

During the second half-cycle of the keying wave, the negative voltage (part of that on lead 16) is applied to cathode 63 and to anode 69. The negative cathode voltage biases on diode 58, 63, but the negative anode voltage biases off diode 62, 69. During this second half-cycle, the positive voltage (part of that on lead 15) is applied to anode 64 and to cathode 68. The positive anode voltage biases on diode 59, 64, but the positive cathode voltage biases off diode 61, 68. Thus, during this second half-cycle, both diodes of twin-diode 60 are biased off, but both diodes of twin-diode 57 are biased to conduct.

During this second half-cycle, then, the negative voltage at the cathode of diode 25 is effective to cause a flow of current through resistors 54 and 56 (the D.C. return), resistor 28, ground, resistor 66, diode 64, 59, and back to the cathode of diode 25. This causes the lower end of resistor 28 to be positive with respect to its upper end or ground. (If the voltage at the cathode of diode 25 had been positive during this second half-cycle, the flow of current would have been in the other direction, through diode 58, 63, and the upper end of resistor 28 would become positive with respect to its lower end.)

It may be seen, from the above, that the "throw" of switch 26 is to load 28 during the second half-cycle of the keying wave.

It may be seen, from the foregoing description, that the resultant voltage across 27, 28 (from the lower end of resistor 27 to the upper end of resistor 28, or ground) has under the above conditions departed from its zero value (which it has when the amplitude of the voltage at 24 is unvarying, resulting in the disappearance of the square waves at the cathode of diode 25), giving in this particular case a D.C. control potential (at the lower end of resistor 27) which is positive with respect to ground. This control potential is filtered by the series resistor 78 and the shunt capacitor 79 and applied to the reactance tube in the aural transmitter, to control the center frequency of the aural transmitter in such a direction as to return it to the correct frequency.

Figure 3:
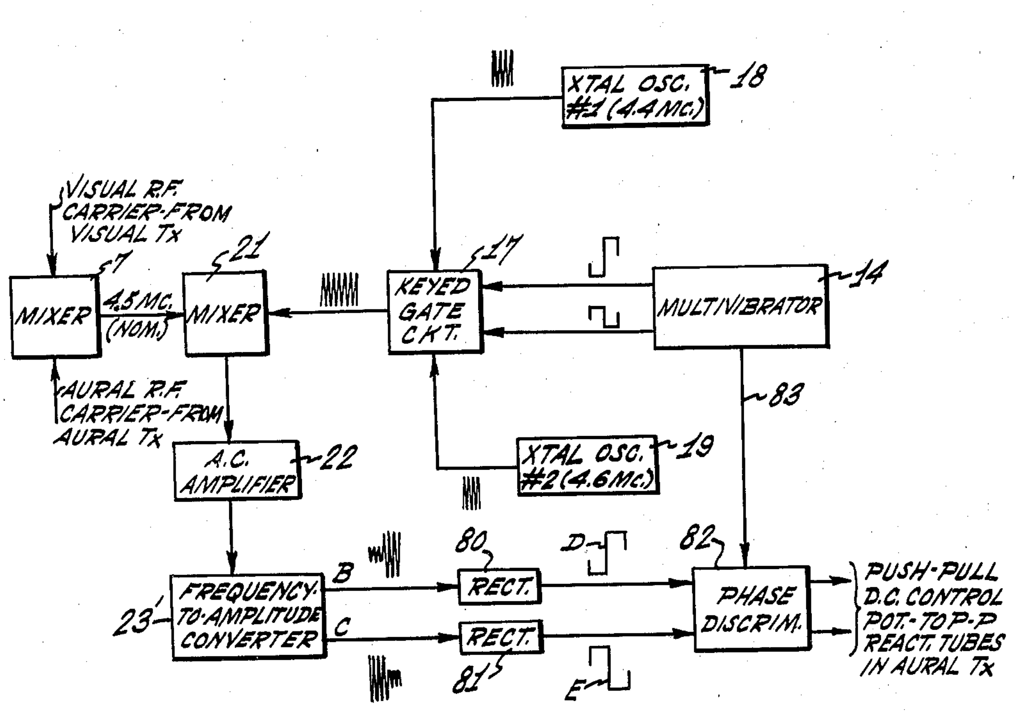
Fig. 3 is a block diagram of an alternative frequency control system.

Fig. 3 is a partial block diagram of a modified frequency control system according to the present invention. The Fig. 3 system is in certain respects more complicated than the Fig. 1 system, previously described. As in Fig. 1, the aural-visual difference frequency out of mixer 7 is fed to one input of mixer 21. The other input to this latter mixer comes from the output of a keyed gate circuit 17 which is keyed by the output of multivibrator 14. Just as in Fig. 1, the outputs of oscillator 18 (frequency 4.4 mc.) and oscillator 19 (frequency 4.6 mc.) are alternately gated to mixer 21.

The output of mixer 21 is amplified in an A.C. amplifier 22 and then applied to the input of a "double-ended" frequency-to-amplitude converter 23′ which has two outputs B and C. Converter 23′ has two legs, each containing a series LC resonant circuit. In the Fig. 3 circuit, the resonant frequency of these legs must be 100 kc. In one leg the capacitor is in the ground side, while in the other, the inductor is in the same location. Therefore, the outputs of the two legs (one output is at B and the other at C) have output voltage vs. input frequency characteristics of opposite slopes. At 100 kc., the output voltages from each leg (at B and C) are equal.

If the aural carrier frequency changes, for example increases, the signal fed to the input of converter 23′ changes or alternates in frequency at the multivibrator switching rate. This alternating (in frequency) signal is converted (by 23′) to signals at B and C whose amplitude alternates between two values corresponding to the difference in frequency. These signals, considered with respect to one another, are in push-pull, and may be as illustrated by the waveforms adjacent B and C.

The signals appearing at B and C are rectified by separate rectifiers 80 and 81, respectively, and in the above case produce (at the rectifier outputs) square waves at the multivibrator frequency, which are in push-pull when considered with respect to one another. The output of rectifier 80 may then be as represented by waveform D, and the output of rectifier 81 may be as represented by waveform E.

A D.C. voltage proportional to the amplitude of the push-pull square waves is obtained in a phase discriminator 82, to which the rectifier outputs are fed. The original multivibrator switching signal is used as the reference for phase discriminator 82, by means of a feed connection 83 from the multivibrator to this discriminator. The discriminator 82 provides a push-pull output, which is the D.C. control potential.

If the aural frequency drifts low, the phase of the square wave produced at each leg of the converter 23′ shifts 180°, and the two outputs are still in push-pull. Under these conditions, the output of the phase discriminator 82 changes polarity, and is still proportional to the amount of the aural frequency shift.

The push-pull output of phase discriminator 82 is fed as an automatic frequency control potential to the push-pull reactance tubes of the aural transmitter, to control the center frequency of the aural oscillator in such a way as to maintain such center frequency at the required, desired, predetermined spacing of 4.5 mc. from the visual carrier. Just as in Fig. 1, the center frequency control of the aural transmitter operates to produce, at the output of mixer 7, an aural-visual (intercarrier) beat frequency exactly halfway between the frequencies of the crystal oscillators 18 and 19. The aural carrier must therefore be on frequency, since the visual carrier frequency is a reference.

Figure 4:
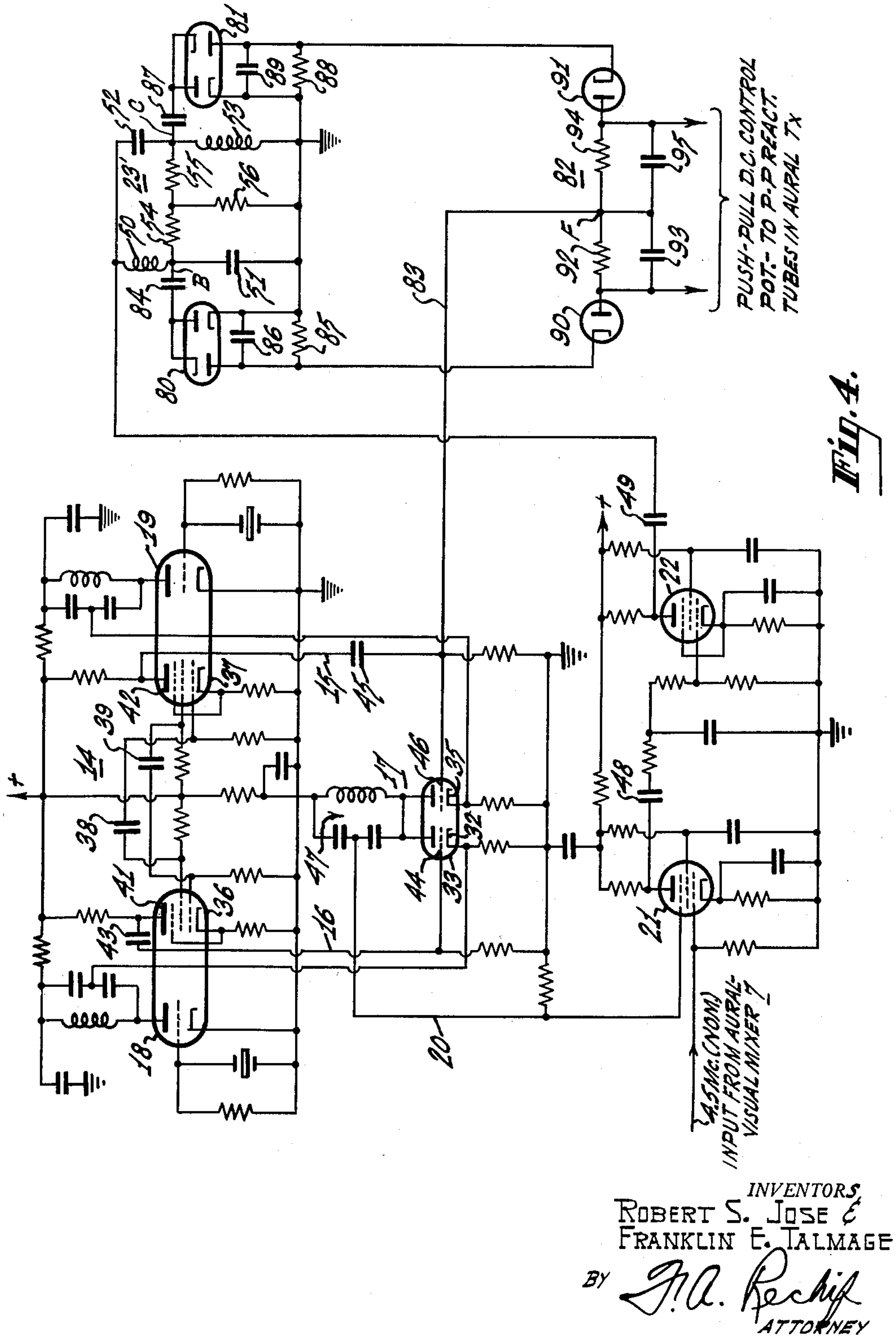
Fig. 4 is a detailed circuit diagram of the main portion of the Fig. 3 system.

Fig. 4 is a detailed schematic (circuit) diagram of the Fig. 3 arrangement. In Fig. 4, the circuitry of items 14, 17, 18, 19, 21, and 22 is essentially the same as that previously described in connection with Fig. 2, so the description will not be repeated here. In Fig. 4, the connections from the respective crystal oscillators 18 and 19 to the gate circuit 17 are taken off from the anodes of the respective oscillator tubes, by way of capacitive voltage dividers.

In Fig. 4, the output of A.C. amplifier 22 is fed through a coupling capacitor 49 to the input of a frequency-to-amplitude converter 23′. Converter 23′ has two legs each containing a series LC resonant circuit, one leg comprising inductor 50 and capacitor 51, and the other leg comprising capacitor 52 and inductor 53. In leg 50—51, the capacitor 51 is in the ground side, since inductor 50 and capacitor 51 are connected in series in that order from one side of capacitor 49 to ground; in leg 52—53, the inductor 53 is in the ground side, since capacitor 52 and inductor 53 are connected in series in that order from one side of capacitor 49 to ground. The legs 50—51 and 52—53 should each be series resonant at 100 kc., for the Fig. 4 arrangement to operate properly. Because of the opposite position of the components in the two legs of circuit 23′, the slope of the output voltage vs. input frequency characteristic for leg 50—51 is opposite from that of the output voltage vs. input frequency characteristic for leg 52—53. At a 100-kc. input frequency to converter 23′, the output voltages from each leg (at B and C, respectively, where point B is at the upper or ungrounded terminal of capacitor 51 and where point C is at the upper or ungrounded end of inductor 53) are equal.

When the aural center frequency drifts from its nominal or correct value, the output of the mixer 21 changes frequency back and forth at the multivibrator 14 switching rate, as previously described. This alternating (in frequency) signal is amplified by amplifier 22 and is then converted by converter 23′ to signals at points B and C whose amplitude alternates between two values corresponding to the difference in frequency. These signals may have a waveform such as illustrated at B and C in Fig. 3.

The signal at point B is applied through a coupling capacitor 84 to a double or twin-diode vacuum tube 80 connected as a full-wave rectifier. This rectifier has a load comprising a resistor 85 shunted by a capacitor 86, one end of this load being connected to ground. The signal at point C is applied through a coupling capacitor 87 to a double or twin-diode vacuum tube 81 connected as a full-wave rectifier. The latter rectifier has a load comprising a resistor 88 shunted by a capacitor 89, one end of this latter load being connected to ground.

The signals at B and C, alternating in amplitude between two values, are rectified by rectifiers 80 and 81, respectively, producing across the respective loads 85 and 88 square waves at the multivibrator keying rate. These square waves are in push-pull when considered with respect to one another, and may have waveforms such as illustrated at D and E in Fig. 3.

The voltage across load 85 is fed to one input of the phase discriminator 82, by means of a lead extending from the ungrounded end of this load to the cathode of a diode vacuum tube 90. Likewise, the voltage across load 88 is fed to another input of discriminator 82, by means of a lead extending from the ungrounded end of this load to the cathode of a diode vacuum tube 91. A load circuit comprising a resistor 92 paralleled by a capacitor 93 is connected from the anode of diode 90 to a junction point F. A load circuit comprising a resistor 94 paralleled by a capacitor 95 is connected from the anode of diode 91 to junction point F. The phase discriminator 82 has supplied thereto, as a reference, the original multivibrator switching signal, by means of a lead 83 coupled between capacitor 45 and point F.

A push-pull D.C. voltage proportional to the amplitude of the push-pull square wave D, E (one square wave of this push-pull pair appearing across load 85 and the other square wave of said pair appearing across load 88) is obtained in the phase discriminator 82, using the switching signal (supplied by lead 83) as the reference. This push-pull D.C. control potential or control voltage is produced at the anode of diodes 90 and 91. The D.C. control potential is fed back to the push-pull reactance tube circuit in the aural transmitter, to control the center frequency of the aural oscillator.

The waveforms illustrated in Fig. 3 (at B, C, D, and E) may be those produced when the aural center frequency shifts or drifts upward from its nominal value. If the aural center frequency drifts below its nominal value, the phase of the square wave produced at each leg of the converter 23' shifts 180°, and the two outputs (at B and C) are still in push-pull. Under these conditions, the output of the phase discriminator changes polarity, but is still proportional to the amount of the aural center frequency shift.

The following values for certain of the circuit components in Fig. 2 are given by way of example. These were the values used in a circuit built according to Fig. 2 and successfully tested.

| | | |
|---|---|---|
| Resistors: | | |
| 27 | megohm | 1 |
| 28 | do | 1 |
| 40 | ohms | 100 |
| 65 | do | 120,000 |
| 66 | do | 120,000 |
| 70 | do | 120,000 |
| 71 | do | 120,000 |
| 78 | do | 68,000 |
| Capacitors: | | |
| 30 | mmfd | 100 |
| 31 | mmfd | 100 |
| 34 | mmfd | 100 |
| 38 | mfd | 0.033 |
| 39 | mfd | 0.033 |
| 43 | mfd | 1 |
| 45 | mfd | 1 |
| 48 | mmfd | 1000 |
| 49 | mfd | 1 |
| 51 | mmfd | 82 |
| 52 | mmfd | 82 |
| 67 | mfd | 1 |
| 73 | mfd | 1 |
| 74 | mfd | 1 |
| 75 | mfd | 1 |
| 76 | mfd | 1 |
| 77 | mfd | 1 |
| 79 | mfd | 10 |

What is claimed is:

1. An automatic frequency control system comprising means for developing radio frequency waves the frequency of which is to be maintained at a predetermined value, two stable frequency wave sources whose frequencies lie equal amounts respectively above and below said predetermined frequency, means for separately and alternately mixing the wave output of each of said two stable frequency sources with said developed waves, thereby to produce two beat frequency waves one during each of said separate mixings which two latter waves are equal in frequency when the frequency of said developed waves is the same as said predetermined frequency but which are unequal in frequency when the frequency of said developed waves differs from said predetermined frequency, means for detecting a frequency inequality between said two beat frequency waves and for producing a control potential proportional to the amount of such inequality, and means for utilizing said control potential to move the frequency of said developed waves toward said predetermined value.

2. An automatic frequency control system comprising means for developing radio frequency waves the frequency of which is to be maintained at a predetermined value, two stable frequency wave sources whose frequencies lie equal amounts respectively above and below said predetermined frequency, a mixer having two inputs, means for feeding said developed waves to one of said inputs, switching means for separately and alternately feeding the wave output of each of said two stable frequency sources to the other of said inputs, thereby to produce in the output of said mixer two beat frequency waves one during the time of feeding of the output of each of said stable frequency sources to said mixer, these two latter waves being equal in frequency when the frequency of said developed waves is the same as said predetermined frequency but being unequal in frequency when the frequency of said developed waves differs from said predetermined frequency; means for detecting a frequency inequality between said two beat frequency waves and for producing a control potential proportional to the amount of such inequality, and means for utilizing said control potential to move the frequency of said developed waves toward said predetermined value.

3. A control system for maintaining a predetermined frequency difference between two sources of radio frequency waves comprising means for mixing waves derived from said sources to produce a difference frequency wave, two stable frequency wave sources whose frequencies lie equal amounts respectively above and below said predetermined frequency, means for separately and alternately mixing the wave output of each of said two stable frequency sources with said produced difference frequency, thereby to produce two beat frequency waves one during each of said separate mixings which two latter waves are equal in frequency when said produced frequency is the same as said predetermined frequency but which are unequal in frequency when said produced frequency differs from said predetermined frequency, means operating in response to a condition of frequency inequality between said two beat frequency waves for producing a control potential proportional to the amount of such inequality, and means for utilizing said control potential to vary the frequency of one of said two radio frequency sources.

4. In a television transmitter, a control system for maintaining a predetermined frequency difference between the average aural and visual carriers of said transmitter comprising means for mixing said aural and visual carrier waves to produce a difference frequency wave, two stable frequency wave sources whose frequencies lie equal amounts respectively above and below said predetermined frequency, means for separately and alternately mixing the wave output of each of said two stable frequency sources with said produced difference frequency, thereby to produce two beat frequency waves one during each of said separate mixings which two latter waves are equal in frequency when said produced frequency is the same as said predetermined frequency but which are unequal in frequency when said produced frequency differs from said predetermined frequency, means operating in response to a condition of frequency inequality between said two beat frequency waves for producing a control potential proportional to the amount of such inequality, and means for utilizing said control potential to vary the average frequency of said aural carrier.

5. In a television transmitter, a control system for maintaining a predetermined frequency difference between the average aural and visual carriers of said transmitter comprising means for mixing said aural and visual carrier waves to produce a difference frequency wave, two stable frequency wave sources whose frequencies lie equal amounts respectively above and below said predetermined frequency, a mixer having two inputs, means for feeding said difference frequency wave to one of said inputs, switching means for separately and alternately feeding the wave output of each of said two stable frequency sources to the other of said inputs, thereby to produce in the output of said mixer two beat frequency waves one during the time of feeding of the output of each of said stable frequency sources to said mixer, these two latter waves being equal in frequency when said produced difference frequency is equal to said predetermined frequency but being unequal in frequency when said produced difference frequency differs from said predetermined frequency; means for detecting a frequency inequality between said two beat frequency waves and for producing a control potential proportional to the amount of such inequality, and means for utilizing said control potential to vary the frequency of one of said carriers in such a direction as to cause said produced difference frequency to approach said predetermined frequency.

6. A system as defined in claim 5, wherein the control potential is utilized to vary the average frequency of said aural carrier.

7. In a television transmitter, a control system for maintaining a predetermined frequency difference between the unmodulated aural and visual carriers of said transmitter comprising means for mixing said aural and visual carrier waves to produce a difference frequency wave, two stable frequency sources whose frequencies lie equal amounts respectively above and below said predetermined frequency, a mixer having two inputs, means for feeding said difference frequency wave to one of said inputs, switching means for separately and alternately feeding the wave output of each of said two stable frequency sources to the other of said inputs, thereby to produce in the output of said mixer two beat frequency waves one during the time of feeding of the output of each of said stable frequency sources to said mixer, these two latter waves being equal in frequency when said produced difference frequency is equal to said predetermined frequency but being unequal in frequency when said produced difference frequency differs from said predetermined frequency; a frequency-responsive circuit receptive of said beat frequency waves and adapted to produce a varying amplitude output signal in response to a condition of frequency inequality between said two beat frequency waves, and means for employing said last-mentioned signal to effect a variation in the frequency of one of said carriers in such a direction as to cause said produced difference frequency to approach said predetermined frequency.

8. In a television transmitter, a control system for maintaining a predetermined frequency difference between the average aural and visual carriers of said transmitter comprising means for mixing said aural and visual carrier waves to produce a difference frequency wave, two stable frequency wave sources whose frequencies lie equal amounts respectively above and below said predetermined frequency, a mixer having two inputs, means for feeding said difference frequency wave to one of said inputs, switching means for separately and alternately feeding the wave output of each of said two stable frequency sources to the other of said inputs, thereby to produce in the output of said mixer two beat frequency waves one during the time of feeding of the output of each of said stable frequency sources to said mixer, these two latter waves being equal in frequency when said produced difference frequency is equal to said predetermined frequency but being unequal in frequency when said produced difference frequency differs from said predetermined frequency; a frequency-responsive circuit receptive of said beat frequency waves and adapted to produce a varying amplitude output signal in response to a condition of frequency inequality between said two beat frequency waves, means for converting said varying amplitude output signal to a direct voltage proportional to the amount of said frequency inequality, and means for utilizing said direct voltage to vary the frequency of one of said carriers in such a direction as to cause said produced difference frequency to approach said predetermined frequency.

9. A system as defined in claim 8, wherein the direct voltage is utilized to vary the average frequency of said aural carrier.

10. An automatic frequency control system comprising means for developing radio frequency waves the frequency of which is to be maintained at a predetermined value, two stable frequency wave sources whose frequencies lie equal amounts respectively above and below said predetermined frequency, a mixer having two inputs, means for feeding said developed waves to one of said inputs, a multivibrator for generating two substantially rectangular switching waves of opposite relative polarities, means responsive to said switching waves for alternately feeding the wave output of each of said two stable frequency sources to the other input of said mixer, a frequency-to-amplitude converter coupled to the output of said mixer, means responsive to the output of said converter for developing a control voltage which is proportional to deviations in the frequency of said developed waves from said predetermined value, and means for utilizing said control voltage to move the frequency of said developed waves toward said predetermined value.

11. An automatic frequency control system comprising means for developing radio frequency waves the frequency of which is to be maintained at a predetermined value, two stable frequency wave sources whose frequencies lie equal amounts respectively above and below said predetermined frequency, a mixer having two inputs, means for feeding said developed waves to one of said inputs, a multivibrator for generating two substantially rectangular switching waves of opposite relative polarities, means responsive to said switching waves for alternately feeding the wave output of each of said two stable frequency sources to the other input of said mixer, a frequency-to-amplitude converter coupled to the output of said mixer, means receptive of the output of said converter for developing therefrom a voltage wave whose amplitude is proportional to the output of said converter, means for producing from said last-mentioned wave a direct control voltage which is proportional to deviations in the frequency of said developed waves from said predetermined value, and means for utilizing said control voltage to move the frequency of said developed waves toward said predetermined value.

12. An automatic frequency control system comprising means for developing radio frequency waves the frequency of which is to be maintained at a predetermined value, two stable frequency wave sources whose frequencies lie equal amounts respectively above and below said predetermined frequency, a mixer having two inputs, means for feeding said developed waves to one of said inputs, a multivibrator for generating two substantially rectangular switching waves of opposite relative polarities, means responsive to said switching waves for alternately feeding the wave output of each of said two stable frequency sources to the other input of said mixer, a frequency-to-amplitude converter coupled to the output of said mixer, a rectifier coupled to the output of said converter for developing therefrom a voltage wave having the frequency of said switching waves and having an amplitude proportional to the output of said converter, means operated by said switching waves for feeding individual half-cycles of the voltage wave output of said rectifier to respective load circuits connected in series opposition, to thereby produce across said load circuits a resultant direct control voltage which is proportional to deviations in the frequency of said developed waves from said predetermined value, and means for utilizing said control voltage to move the frequency of said developed waves toward said predetermined value.

13. In a television transmitter, a control system for maintaining a predetermined frequency difference between the center aural and visual carriers of said transmitter comprising means for mixing said aural and visual carrier waves to produce a difference frequency wave, two stable frequency wave sources whose frequencies lie equal amounts respectively above and below said predetermined frequency, a mixer having two inputs, means for feeding said difference frequency wave to one of said inputs, a multivibrator for generating two substantially rectangular switching waves of opposite relative polarities, means responsive to said switching waves for alternately feeding the wave output of each of said two stable frequency sources to the other input of said mixer, a frequency-to-amplitude converter coupled to the output of said mixer, means receptive of the output of said converter for developing therefrom a voltage wave whose amplitude is proportional to the output of said converter, means for producing from said last-mentioned wave a direct control voltage which is proportional to deviations of said produced difference frequency from said predetermined frequency, and means for utilizing said control voltage to vary the center frequency of said aural carrier in such a direction as to cause said produced difference frequency to approach said predetermined frequency.

14. A system for maintaining a predetermined frequency difference between two carrier waves comprising a carrier wave source providing a carrier wave of fixed frequency, a second carrier wave source, means for controlling the carrier wave frequency provided by said second carrier wave source, an oscillator providing an output fixed in frequency by a predetermined frequency value above the desired predetermined frequency difference between the output frequencies of said first and second sources, a second oscillator providing an output fixed in frequency by a predetermined frequency value below the desired predetermined frequency value between the output frequencies of said first and second sources, a source of square waves, said source providing a pair of square waves of opposite polarity, a keyed gate circuit, means to apply the outputs of said first and second oscillators to said gate circuit, means to apply said pair of square waves to said gate circuit to provide an output therefrom alternating periodically between the outputs of said first and second oscillators, a first mixer, means to apply the outputs of said carrier wave sources to said first mixer to provide a difference frequency output therefrom, a second mixer, means to apply the output from said first mixer and said keyed gate circuit to said second mixer whereby to provide an output from said second mixer comprising two beat frequency waves, one wave occurring during each of the gating periods resulting from the pair of square waves applied to said keyed gate circuit, said two beat frequency waves being equal in frequency when said predetermined frequency difference exists but being unequal upon departure from said predetermined frequency difference, a frequency to amplitude converter, means to apply the output of said second mixer to said converter, rectifying means coupled to the output of said converter whereby to derive an output proportional to the departure from said predetermined frequency difference, means coupled to said rectifying means to provide a direct current output therefrom having a characteristic indicative of the direction of frequency change of said second carrier wave source, and means to apply said direct current output to affect said means for controlling said second carrier wave source.

15. A system for maintaining a predetermined frequency difference between two carrier waves comprising a carrier wave source providing a carrier wave of fixed frequency, a second carrier wave source, means for controlling the carrier wave frequency provided by said second carrier wave source, an oscillator providing an output fixed in frequency by a predetermined frequency value above the desired predetermined frequency difference between the output frequencies of said first and second sources, a second oscillator providing an output fixed in frequency by a predetermined frequency value below the desired predetermined frequency value between the output frequencies of said first and second sources, a source of square waves, said source providing a pair of square waves of opposite polarity, a keyed gate circuit, means to apply the outputs of said first and second oscillators to said gate circuit, means to apply said pair of square waves to said gate circuit to provide an output therefrom alternating periodically between the outputs of said first and second oscillators, a first mixer, means to apply the outputs of said carrier wave sources to said first mixer to provide a difference frequency output therefrom, a second mixer, means to apply the output from said first mixer and said keyed gate circuit to said second mixer whereby to provide an output from said second mixer comprising two beat frequency waves, one wave occurring during each of the gating periods resulting from the pair of square waves applied to said keyed gate circuit, said two beat frequency waves being equal in frequency when said predetermined frequency difference exists but being unequal upon departure from said predetermined frequency difference, a frequency to amplitude converter, means to apply the output of said second mixer to said converter, a rectifier coupled to the output of said converter whereby to derive a square wave of an amplitude proportional to the departure from said predetermined frequency difference and of a time phase indicative of the frequency variation of the output of said second carrier wave source, an adder circuit, means to couple the output of said rectifier to said adder circuit whereby to provide a direct current output therefrom of a polarity indicative of the direction of frequency change of said second carrier wave source and of a magnitude indicative of amount of frequency change of said second carrier wave source, and means to apply said direct current output to affect said means for controlling said second carrier wave source.

References Cited in the file of this patent

UNITED STATES PATENTS

| | | |
|---|---|---|
| 2,201,554 | Clothier et al. | May 21, 1940 |
| 2,424,833 | Korman | July 29, 1947 |
| 2,747,095 | Boucke | May 22, 1956 |
| 2,788,450 | Sunstein | Apr. 9, 1957 |
| 2,790,905 | Wright | Apr. 30, 1957 |
| 2,896,074 | Newsom et al. | July 21, 1959 |